United States Patent [19]

Hong et al.

[11] Patent Number: 4,822,497
[45] Date of Patent: Apr. 18, 1989

[54] METHOD FOR SOLIDS SEPARATION IN A WET OXIDATION TYPE PROCESS

[75] Inventors: Glenn T. Hong, Tewksbury; William R. Killilea, West Chelmsford, both of Mass.; Terry B. Thomason, Houston, Tex.

[73] Assignee: Modar, Inc., Houston, Tex.

[21] Appl. No.: 99,773

[22] Filed: Sep. 22, 1987

[51] Int. Cl.⁴ .............................................. C02F 1/72
[52] U.S. Cl. ..................... 210/721; 210/177; 210/761
[58] Field of Search ............... 210/177, 181, 721, 722, 210/737, 761, 766, 774

[56] References Cited

U.S. PATENT DOCUMENTS

| | | | |
|---|---|---|---|
| 2,474,705 | 6/1949 | Vaughan et al. | 210/177 |
| 3,807,564 | 4/1974 | Hess et al. | 210/177 |
| 4,113,446 | 9/1978 | Modell et al. | 48/202 |
| 4,171,265 | 10/1979 | Battigelli et al. | 210/181 X |
| 4,229,296 | 10/1980 | Wheaton et al. | 210/177 X |
| 4,338,199 | 7/1982 | Modell | 210/721 |
| 4,543,190 | 9/1985 | Modell | 210/721 |
| 4,564,458 | 1/1986 | Burleson | 210/747 |
| 4,572,797 | 2/1986 | Silver | 210/722 X |
| 4,594,164 | 6/1986 | Titmas | 210/741 |

FOREIGN PATENT DOCUMENTS 584671 1/1947 United Kingdom .

Primary Examiner—Charles Hart
Attorney, Agent, or Firm—Kenyon & Kenyon

[57] ABSTRACT

The present invention relates to a novel aqueous-phase oxidizer and solids separator reactor. More particularly, the invention relates to a two zone pressure vessel in which precipitates and other solids fall or are sprayed from a supercritical temperature super zone into a lower temperature sub zone. The feed material may consist of various waste products which are subsequently oxidized in the super zone of the pressure vessel. The resultant brine or slurry which is found at the lower temperature sub zone of the vessel is removed via a pipe and disposed of accordingly.

10 Claims, 2 Drawing Sheets

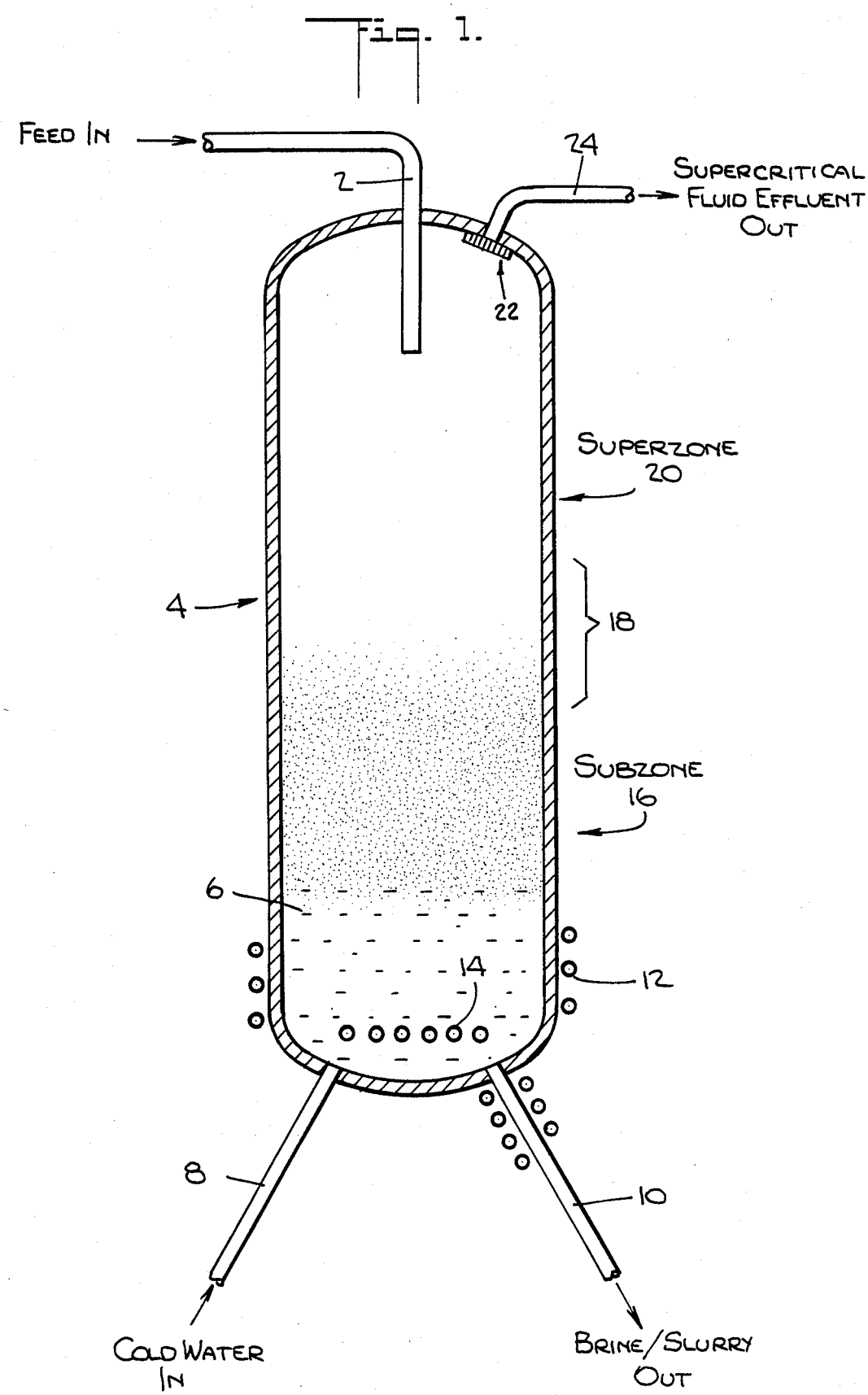

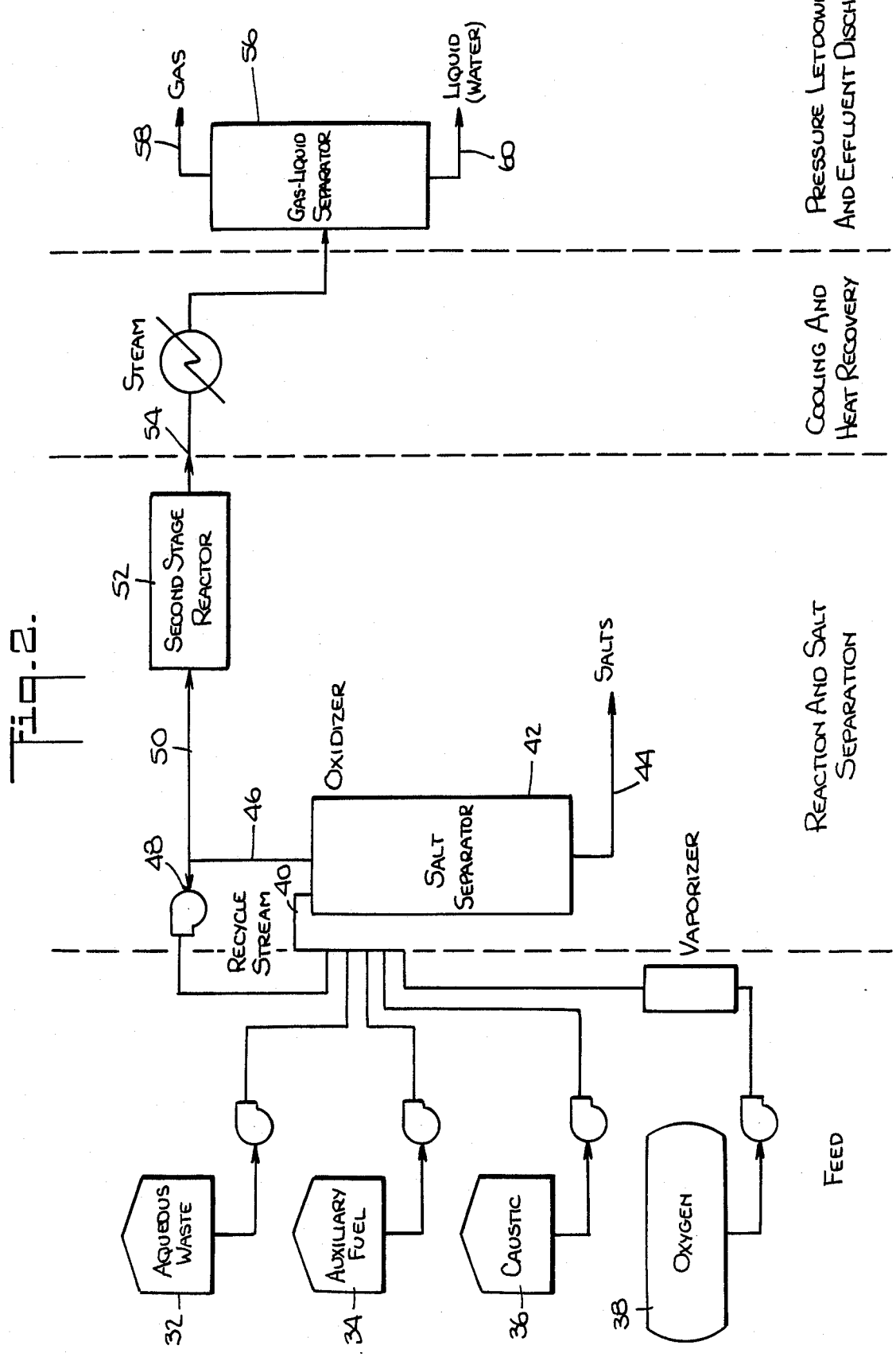

METHOD FOR SOLIDS SEPARATION IN A WET OXIDATION TYPE PROCESS

The present invention relates to the field of oxidation of substances in water, and more particularly to a multi-temperature zone aqueous-phase oxidizer and solids separator.

BACKGROUND OF THE INVENTION

The waste disposal problem currently encountered by public, private, and government interests has numerous facets. The variables include waste streams comprised of a broad spectrum of wastes, coupled with varying cost and final effluent requirements. For example, one waste stream may include sludge from a municipal sewage treatment facility with its high bacterial counts, while another may contain a mixture of hydrocarbons including various halogens, sulfur and light metal elements such as sodium. Furthermore, many waste streams may also include hazardous heavy metal ions such as lead or chromium. A typical waste stream may well include any one or more of the aforementioned wastes as well as various particulates all in differing levels of concentrations. It quickly becomes apparent that an efficient, broad spectrum waste treatment process would be of great utility in addressing this problem. The present disclosure sets forth both a method and apparatus that can handle the wide variety of wastes described above in a cost and energy efficient manner.

In the past, a number of systems have been proposed for handling wastes of this nature. One group of such systems uses the unique properties of water when it is in its supercritical state (above 374° C. and 3,206 psi). In this high-energy, dense-vapor form, water dissolves normally insoluble organics and permits the separation and disposal of inorganics, for example, metals. The end products are carbon dioxide, salt, water, and heat. This technology is covered in U.S. Pat. Nos. 4,113,446, 4,338,199, and 4,543,190. In the process described therein, the waste solution is pressurized and fed to the reactor along with compressed oxygen. Alkaline material may be injected into the feed stream in order to neutralize any acids. The combined streams are raised to at least the critical point, where the rapid oxidation begins. Part of the effluent may be then recycled to or heat exchanged with the raw stream. The reaction products of salt, superheated water, and carbon dioxide are cooled and discharged at atmospheric conditions. The heat released by cooling the effluent can be used for feed preheating, steam generation, power generation, or for lower-level heating requirements. Salts in the incoming feed as well as those generated in the process are removed as a brine. The salts have very low solubility in the supercritical water but are typically highly soluble in cool water. The process first separates the salts and then redissolves them in a cool brine as a means of transporting them from the reactor. In the process described above, the feed material is oxidized in one vessel while the solids are separated out in a subsequent vessel. There is a substantial risk of solids deposition and system plugging in passing to this second vessel.

Another process for conducting chemical reactions involving organic and inorganic waste streams at supercritical conditions is described in U.S. Pat. No. 4,594,164. In that process, continuously flowing water contaminated with organic and inorganic materials is fed to the top of a downdraft column of a hydraulic column reactor, and conducted to the bottom thereof to a reaction chamber. Supercritical water conditions are created in the reaction chamber in order to oxidize the waste elements in the water. The reacted fluid is conducted back to the surface over a spiral baffle or rib and through a series of annuli. Spinning of the rising fluid caused by the spiral baffle induces centrifugal separation of the fluid into various strata of differently weighted components which travel up separate annuli. The resultant materials are removed for further solids separation, treatment and disposal. A similar system is described in U.S. Pat. No. 4,564,458. In that system, a deep well is utilized to form a reaction chamber for combustible waste in water. A stream of water borne combustible waste is delivered into the deep well, one sufficiently deep to obtain a pressure and temperature in a bottom located reaction chamber at which the water becomes supercritical. A pipe is used to deliver oxygen under pressure to the reaction chamber for combusting oxygen dissolved in the supercritical water with the waste materials. The resulting effluent is conducted upwards through a separate updraft column back to the surface for further treatment and disposal.

Problems likely to be encountered in such systems would include corrosion, and possible system leakage into the surrounding area. While corrosion in all supercritical water reaction systems is a problem, the inaccessibility of the underground components greatly increases the difficulty of monitoring and correcting any corrosion problems. Moreover, any significant corrosion could lead to leaks into the surrounding areas. Another problem with these systems is their handling of solids. Inorganic salts would cause scaling on the walls of the system pipes, leading to reduced heat transfer and possible plugging. Frequent shutdowns would be required for system cleaning. The entraining of any solids into the flow of the effluent stream may be another potential problem for the deep well system. Deep well systems must maintain low velocities to minimize friction losses. The design velocities of deep well systems are in the 1-20 feet/sec range, which is unlikely to be high enough to entrain all solids to the top of the effluent stream. Solids would build up near the bottom of the effluent pipe and if these are insoluble in water and acid, they may be very difficult to remove.

SUMMARY OF THE INVENTION

It is therefore an object of this invention to provide for a safer, more efficient, and lower cost treatment of various waste streams.

It is a further object of this invention to provide a method for treating materials, such as water contaminated with organic and inorganic materials, at conditions above the critical point of water. These conditions are denoted as supercritical.

It is still a further object of this invention to provide a method for treating materials, such as water contaminated with organic and inorganic materials, at supercritical temperatures and subcritical, yet elevated, pressures of water. These conditions will be referred to as semicritical.

It is another object of this invention to provide a method for the oxidizing of organic materials to obtain useful energy and to detoxify or destroy noxious and toxic organic materials and to remove unwanted salts from water.

It is yet another object of this invention to provide a method for the removal of solids from a waste stream.

The objects of this invention are accomplished by providing a multi-temperature zone salt separator with an oxidation zone in one portion and a brine or slurry take-off of inorganic solids in another portion. In general, a single pressure vessel is utilized for supercritical or semicritical water oxidation of organic materials and separation of inorganic materials from the supercritical or semicritical fluid. This vessel is comprised of two zones, a supercritical temperature super zone and a lower temperature sub zone. Pressurized feed material is admitted via a feed pipe into the super zone of the vessel which is also the upper portion of the vessel. Oxidation of the organics and oxidizable inorganics takes place in the supercritical temperature super zone. Combusted gas and effluent from this phase exit via a pipe from the super zone of the vessel. The material, usually inorganic salt, that is initially present or formed in the supercritical or semicritical fluid phase and is insoluble therein forms dense brine droplets or solid precipitates which inertially impinge on, and fall by gravity into, a liquid phase provided in the lower temperature, sub zone of the vessel found in the lower portion of the vessel. The liquid phase in the sub zone provides a medium for trapping contacting solids, for dissolving soluble materials, and for forming a slurry of insoluble materials. The resultant solution or slurry is removed from the pressure vessel via a pipe located in the lower, sub zone of the vessel.

The characteristic feature of the invention is that solids in contact with the supercritical temperature process stream are transferred to a liquid phase in a cooler zone within the same vessel, still at elevated pressure, to form a brine or slurry. This technique is essential to the feasibility of removing solids from the high temperature, high pressure process stream. Any significant constriction between the regions of solids formation and solids collection is apt to lead to solids accumulation and eventual plugging of the constriction. Furthermore, it is much easier to remove a cool, high pressure brine or slurry than a hot, high pressure gas with entrained solids from the oxidation system.

BRIEF DESCRIPTION OF THE DRAWINGS

FIG. 1 is a sectional view showing a preferred embodiment of the invention.

FIG. 2 is a schematic diagram of a complete waste stream processing system incorporating the embodiment of FIG. 1.

DETAILED DESCRIPTION OF THE INVENTION

With reference to the embodiment of FIG. 1, pressurized feed material, consisting of various combinations of water, organics, inorganics, particulates, sludge, soil neutralizing agents, salt forming agents, minerals, air, and oxygen or other gases, is admitted via a feed pipe 2 into the super zone at the top of the vessel 4. The vessel may be a shaped hollow closed object with entry and exit ports which is capable of withstanding high pressures and temperatures such as a container or a pipe. Oxidation of organics and oxidizable inorganics takes place in the supercritical temperature super zone 20 where inorganic materials, present in the feed or formed by chemical reaction, form particulate matter or dense brine droplets by nucleation and gas phase precipitation processes. The supercritical temperature fluid phase flows downward and then reverses flow direction. The combusted effluent exits via a pipe 24 at the top of the vessel. Dense matter, such as inorganic material initially present and formed by reaction, which is insoluble in the supercritical temperature fluid continues along the original downward flow path due to a combination of inertia and gravity, and impinges on and falls into the liquid phase 6 provided in the lower temperature sub zone of the vessel 16. As shown by the shading in the Figure, there is a somewhat diffuse boundary 18 between the super and sub zones.

Pressurized liquid medium 8 such as water or an aqueous solution or mixture may be admitted into the bottom, sub zone of the vessel to provide the liquid phase and to establish the temperature gradient and concomitant fluid density gradient within the vessel. Alternatively, the admission of pressurized liquid medium into the sub zone of the vessel may be omitted if external 12 or internal 14 cooling of the sub zone is provided for, thus allowing condensate to form therein and provide the liquid phase. For example, the lower portion of the vessel may be left uninsulated and allowed to cool, thereby forming a condensate liquid phase within the sub zone. The liquid phase in the bottom or sub zone provides a medium for trapping contacting solids, for dissolving soluble materials which were insoluble in the super zone, and for forming a slurry of insoluble materials. The resultant solution or slurry is removed from the pressure vessel via a pipe 10 located in the bottom, sub zone of the vessel.

The rate of admission and removal of liquid into and from the sub zone may be varied depending on operational requirements. For example, the flow of the liquid admitted into the sub zone may be higher than the flow of the resulting solution or slurry from the sub zone in order to provide for a variable liquid level within the sub zone that would rise up, contact, and trap the various solids and precipitates falling, by inertia and gravity, from the super zone into the sub zone of the vessel.

Filters 22 may be installed near the supercritical temperature fluid effluent pipe at the top of the reactor in order to avoid carryover of solids which are not separated by the inertial and gravity effects. These filters may be periodically cleaned by back flow of high pressure gas, fluid, or liquid to clean the solids from the elements. These solids fall to the sub zone of the vessel and are removed in the same fashion as the other solids. These filter elements 22 are located above the tip of the feed nozzle in order to provide a sufficient fluid residence time at the settling velocity required for gravitational separation.

Wth reference now to FIG. 2, a complete process scheme incorporating the embodiment of FIG. 1 is depicted. The feed material is pumped from atmospheric pressure to the pressure of the reaction chamber. The feed generally consists of organic waste material in an aqueous medium 32, oxygen 38 which is stored as a liquid and later vaporized, auxiliary fuel 34 which is added to waste material with a low heating value, and caustic 36 if any of the organic wastes contain heteroatoms which produce mineral acids and it is desired to neutralize these acids and form appropriate salts. Furthermore, a recycle stream 48 of a portion of the oxidized effluent is also mixed with the feed streams to provide for sufficient heating of the feed and to bring the oxidizer influent to optimum conditions. The combined pressurized feed material 40 is admitted into the oxidizer and separator vessel 42 where it is processed as discussed herein. The resultant brine or slurry 44 is removed and the combusted effluent 46 is split into streams 48 and 50. Stream 48 is recycled as herein discussed while stream 50 goes on to a second stage reactor 52. The resulting second stage effluent 54 goes through a cooling and heat recovery process before entering a gas-liquid separator 56. The final effluent of gas 58 and water 60 is then de-pressurized and discharged.

The present invention offers a number of advantages over prior waste disposal systems. The disclosed invention has the ability to treat both organic and inorganic wastes. The process operates at temperatures below levels that form oxides of nitrogen and sulfur, and its closed loop system does not require a stack, scrubber or other device to control pollution. Furthermore, the system disclosed in this invention is transportable and it is thus usable for the on-site decontamination of hazardous wastes. The reactor may also be permanently installed in a waste generator facility. The reactor vessel disclosed in this invention and any accompanying mechanical structures are at once easily transportable yet very sturdy, long lasting and easily accessible for repairs. This is a further advantage that this system has over the previously developed waste control systems such as the deep well supercritical reactors which are not movable, cause a threat to the environment, and are very hard to access for repairs.

In the foregoing specification, this invention has been described with reference to a specific exemplary embodiment thereof. It will, however, be evident that various modifications and changes may be made thereunto without departing from the broader spirit and scope of the invention as set forth in the appended claims. The specifications and drawings included here are, accordingly, to be regarded in an illustrative rather than in a restrictive sense.

For example, the collection of solids may be effected by any solids removal technique or combination of techniques found suitable for the process. Table 1 lists various solids removal techniques which may be useful in this regard. inertial impingement and gravitational settling have already been discussed with reference to the exemplary embodiment of this invention.

TABLE 1

Methods of Separating Solids from Supercritical Fluids

| Description | Force Field Gradient | Comments |
| --- | --- | --- |
| Flow-line interception | Physical | Includes filtration and impingement |
| Inertial deposition | Velocity | Includes cyclone devices and centrifugation |
| Gravity settling | Elevation | |
| Diffusional deposition | Concentration | |
| Electrostatic precipitation | Electric field | |
| Magnetic precipitation | Magnetic field | |
| Thermal precipitation | Temperature | |

Furthermore, the invention is useful for processes carried out both at supercritical conditions of water and at supercritical temperatures and elevated, yet subcritical, pressures of water. For convenience the text sometimes refers to use of the invention with supercritical temperature fluid, but it is to be understood that both a supercritical and a semicritical fluid are included therein.

What is claimed is:

1. A method for the separation of precipitates and other solids from a fluid comprising the steps of:
   (a) introducing a pressurized feed material including water, organics, inorganics, and oxygen into a super zone of a pressurized vessel comprised of said supercritical temperature super zone and a lower temperature sub zone thereby forming a supercritical temperature fluid phase;
   (b) providing a liquid phase in the sub zone of the vessel;
   (c) allowing the supercritical temperature fluid phase to oxidize under supercritical temperature conditions in the super zone and to form an oxidized super fluid phase and precipitates therein;
   (d) transferring the precipitates and other solids from the oxidized supercritical temperature fluid phase in the super zone to the liquid phase provided in the sub zone, to produce a solution or slurry;
   (e) removing the oxidized super fluid phase from the super zone of the vessel; and
   (f) removing the solution or slurry from the sub zone of the vessel.

2. A method according to claim 1 wherein the pressurized feed material is selected from the group comprising water, organics, inorganics, particulates, sludge, soil, neutralizing agents, salt forming agents, minerals, air, and oxygen or other gases, and is admitted by a feed pipe located in the super zone of the vessel.

3. A method according to claim 1 wherein the supercritical temperature fluid phase is oxidized at a supercritical temperature and a supercritical pressure.

4. A method according to claim 1 wherein during its oxidation, the supercritical temperature fluid phase flows toward the sub zone, changes flow direction and the oxidized super fluid phase exits by a pipe from the super zone of the vessel.

5. A method according to claim 1 wherein the precipitates and solids which are insoluble in the oxidized super fluid phase are transferred by inertia and gravity from the supercritical temperature fluid phase in the super zone to the liquid phase provided in the sub zone of the vessel.

6. A method according to claim 1 wherein the liquid phase provided in the sub zone of the vessel is comprised of water, an aqueous solution or mixture admitted into the sub zone from outside the vessel.

7. A method according to claim 6 wherein the solution or slurry containing precipitate is removed via a pipe from the sub zone of the vessel.

8. A method according to claim 1 wherein the liquid phase provided in the sub zone of the vessel is comprised of condensate formed within the sub zone as a result of cooling of the sub zone of the vessel.

9. A method according to claim 8 wherein the solution or slurry containing the precipitates is removed via a pipe from the sub zone of the vessel.

10. A method for the separation of precipitates and other solids from a fluid comprising the steps of:
    (a) introducing a pressurized feed material selected from the group comprising water, organics, inorganics, particulates, sludge, soil, neutralizing agents, salt forming agents, minerals, air, and oxygen or other gases by a feed pipe into a super zone of a pressurized vessel, said vessel comprised of said supercritical temperature super zone above a lower temperature sub zone, thereby forming a supercritical temperature fluid phase;

(b) providing a liquid phase in the sub zone of the vessel by the introduction of water or aqueous solution or mixture via a pipe into the sub zone of said vessel;

(c) allowing the supercritical temperature fluid phase to oxidize and form an oxidized super fluid phase and precipitates therein under supercritical temperature conditions in the super zone;

(d) allowing the precipitates and other solids present in the oxidized super fluid phase to impinge by inertia and fall by gravity from the oxidized super fluid phase in the super zone to the liquid phase provided in the sub zone to produce a solution or slurry;

(e) removing the oxidized super fluid phase from the super zone of the vessel; and (f) removing the solution or slurry from the sub zone of the vessel.

* * * * *